Jan. 2, 1934.  M. L. MARTUS ET AL  1,941,869
DEPOLARIZING ELECTRODE
Filed July 22, 1930
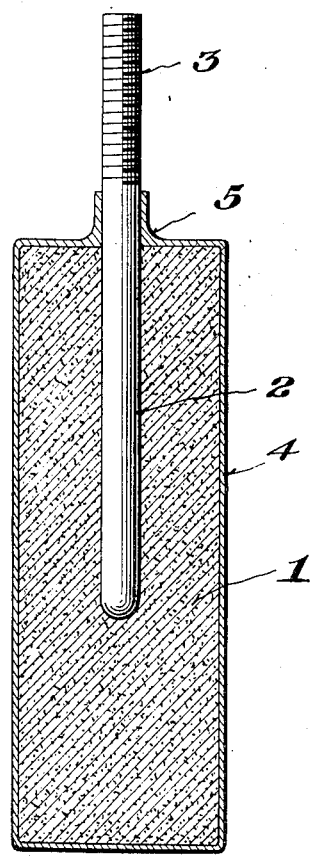
Inventors
Martin L. Martus,
Edmund H. Becker,
By K. P. McElroy
Attorney Patented Jan. 2, 1934

1,941,869

UNITED STATES PATENT OFFICE 1,941,869

DEPOLARIZING ELECTRODE

Martin L. Martus, Woodbury, and Edmund H. Becker, Waterbury, Conn.

Application July 22, 1930. Serial No. 469,919

8 Claims. (Cl. 136—115)

This invention relates to depolarizing electrodes; and it comprises a method of making depolarizing electrodes of copper oxid of even and uniform action and comparatively resistant to the solvent action of caustic soda, wherein a body of copper oxid is provided with a superficial conductive film of sprayed-on molten metal and baked at a low temperature, this metal advantageously being either zinc or copper; and it further comprises as a new depolarizing electrode a body of copper oxid enclosed in a film sheath of baked sprayed-on metal; all as more fully hereinafter set forth and as claimed.

In the Lalande type of cell to which this invention particularly relates, the depolarizer is copper oxid and the electrolyte is a solution of caustic soda, caustic potash although applicable being rarely used. Usually a compact body of granular copper oxid bonded in some way and provided with conductors is used both as a depolarizer and as a cathode. More rarely, copper oxid is used as a granular mass in some sort of container. This type of cell is particularly adapted to closed circuit work and, as usually constructed, is not adapted for open circuit work. Copper oxid is not wholly insoluble in caustic soda solutions and with a cell standing on open circuit, in time copper will migrate to the zinc and cause local action. Very many expedients have been tried to overcome this difficulty.

Another difficulty with these depolarizing electrodes is that of irregularity of action. For practical purposes the electrical conductivity of the oxids of copper depends upon their reduction to metallic copper. The depolarizing surface is initially limited to the points of contact of the oxid with its metallic support, gradually progressing during discharge by following the path of least resistance.

In the art, in order to avoid this irregularity of action, it is known to provide the copper oxid body with superficial copper by reduction in some manner. Such a coating, however, represents merely superficially reduced oxid granules and is not necessarily electrically continuous. In another and prior patent of one of us (Martus 1,450,004, March 27, 1923) whereon the present invention in some of its aspects is an improvement, a better surfacing was provided by coating the electrode with powdered metallic zinc and baking under conditions giving zinc vapors. The result is a surface coating of zinc or brass, according to conditions. In the use of this electrode, on immersing the elements, the zinc dissolves giving a layer of reduced copper.

We have now found that an electrically and mechanically better surface coating of conductive metal can be given by spray-coating the electrode with molten copper or zinc. The metal should be sprayed on under a pressure sufficient to give a substantial impact upon striking the oxid. Either metal can be used and the final result, in the cell, is the same.

With our sprayed coating we have found that the total resistance from the conductor to the solution is less than that obtained with the electrodes of the prior art. It is our belief that the cause for the higher resistance of prior electrodes lies in the fact that the granules of copper oxid are merely in contacting relation with each other, there being no metallic union or continuous conducting surface. Merely reducing the copper oxid to metallic copper does not destroy the granular structure of the electrode and does not greatly decrease the resistance. It is well known that all types of contact resistances, even between two metals, may reach appreciable values.

We have found that, by spraying a pervious layer of metal on the depolarizer electrode by our improved method, we maintain the porosity of the depolarizer, while at the same time we give it a conductive film. This coating also lessens the tendency towards reoxidation.

In the case of the sprayed coating the metal forms a continuous film on the outside of the whole electrode, largely eliminating contact resistance between the depolarizer and its metallic support. The sprayed metal may be built up somewhat around the conductor thus insuring a continuous conducting surface directly from the conductor around the whole external surface of the depolarizer.

The sprayed metal which strikes the copper oxid in our process is considerably cooler than the metal deposited from its vapor as described in my acknowledged Patent No. 1,450,004. This results in less opportunity for reaction between the sprayed metal and the copper oxid and also in a better contact between the two.

A coated electrode produced as so far described is advantageous but we have found that its desirable properties are still further increased by the application of certain methods of heat treatment of the sprayed electrode. Reheating the sprayed electrodes at a low temperature for a time has a sort of annealing effect, removing local strains, and gives a better coating.

In the accompanying drawing we have shown, more or less diagrammatically, the structure of a depolarizing electrode of copper oxid as made by the described process and within the purview of the present invention. In this showing the figure illustrates a body of copper oxid 1. There is shown a conductor 2 partially embedded within the copper oxid. This conductor may be threaded before or after spraying with metal at an exposed end as indicated at 3 for convenience in mounting. The sheath or conducting film of sprayed-on copper or zinc is shown at 4, surrounding the body of copper oxid and also covering the junction 5 of the conductor 2 with this body. As illustrated, it is advantageous to build up the sprayed-on metal at junction 5 both for mechanical reasons and to ensure an electrically conducting union between the conductor and the sheath of sprayed-on metal.

We have found that metal surfaced electrodes made under the present invention have a long "life", exhibiting a considerable resistance to the solvent action of caustic soda, thereby rendering the cells in which they are used less liable to deterioration on open circuit or deterioration due to atmospheric conditions. This effect is quite pronounced and it renders the new type of electrode particularly useful in relations where the current flow is small; where the conditions are nearly those of an open circuit.

As stated, Lalande type cells usually work very well on closed circuit but are not adapted to stand on open circuit. The "shelf loss" is quite large. But there are intermediate conditions where there is a steady small flow of current; a current perhaps of the value of a few milliamperes. Such conditions obtain in various alarm circuits and elsewhere. In these cases it is not the sheer number of ampere hours which is important but the life of the cell in use. We have found that metalizing the electrodes in the manner of the present invention is highly advantageous as giving long life to the cell.

The copper oxid electrode used in the present invention may be of any of the usual shapes and sizes; and it may be composed of granular black copper oxid, bonded in any suitable way. Many ways of bonding granular oxid for making electrodes are disclosed in the prior art. That of Patent No. 1,450,004 which consists in dampening granular copper oxid with caustic soda solution, molding and baking, may be here used. Instead of using black copper oxid, red copper oxids may be employed.

Spraying device for depositing molten metal on surfaces are known and any of the commercial devices of this character may be used.

What we claim is:

1. In the manufacture of electrode elements for galvanic batteries, the process which comprises molding a body of copper oxide about a metallic conductor to make an electrode article, baking the article, spraying a molten metal against the outside of said body and against the joint between said body and said conductor, thereby building up an electrically conductive sheath of metal in electrical contact with said conductor, and thereafter baking the whole at a relatively low temperature to obtain an annealing effect; the said molten metal being selected from a class consisting of copper and zinc.

2. In the manufacture of electrode elements for galvanic batteries, the process which comprises molding a body of copper oxide about a metallic conductor, spraying molten zinc against the said body of copper oxide and against the junction of said body and said conductor, thereby building up an electrically conductive sheath of metal surrounding said body and in electrical contact with said conductor, and thereafter baking the whole at a low temperature to anneal the same.

3. An electrode element for a galvanic battery comprising a conductor, a body of copper oxide molded around the same and in electrical contact therewith, and a sprayed-on-while-molten sheath of metal covering said body of copper oxide as well as the joint between said body and said conductor and forming an electrically conductive union between said body and said conductor, the metal of said sheath being selected from a class consisting of copper and zinc; the said metal sheath having been subjected to a low temperature baking treatment to anneal the same.

4. An electrode element for a galvanic battery comprising a conductor, a body of copper oxide molded around the same and in electrical contact therewith and a sprayed-on-while-molten sheath of zinc covering said body of copper oxide as well as the joint between said body and said conductor and forming a conductive union between said body and said conductor; the said sheath of zinc having been subjected to a low temperature baking treatment to anneal the same.

5. The electrode element of claim 3 wherein the sprayed on metal film is of increased thickness at the joint between said conductor and said body of copper oxide.

6. The electrode element of claim 4 wherein the sprayed on zinc sheath is of increased thickness at the joint between said conductor and said body of copper oxide.

7. The process of claim 1 wherein the molten metal sprayed on is copper.

8. The electrode element of claim 3 wherein the sprayed-on sheath is of copper.

MARTIN L. MARTUS.
EDMUND H. BECKER.